March 15, 1960 C. W. MILLS 2,928,538
TAPE OR FILM CLIP
Filed May 31, 1957
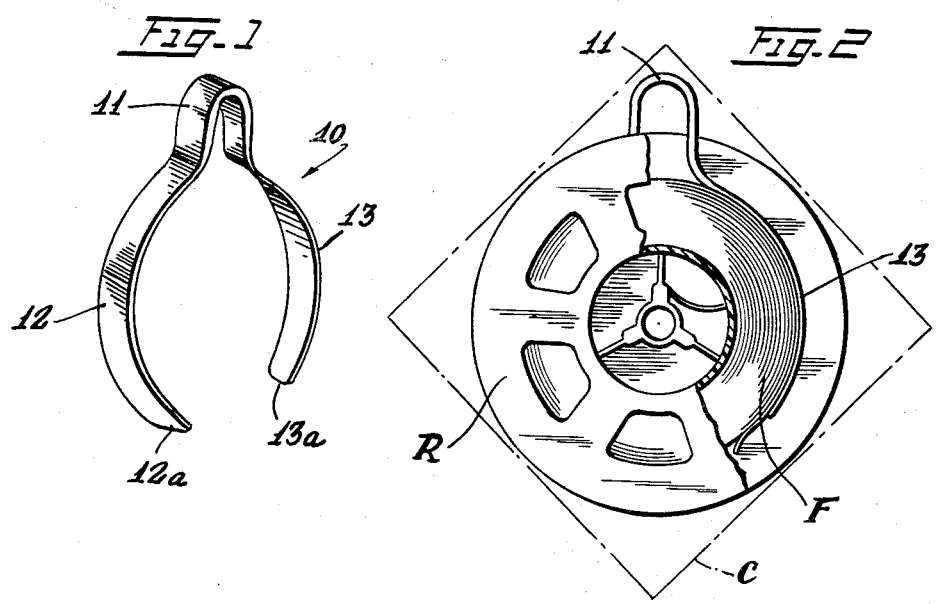
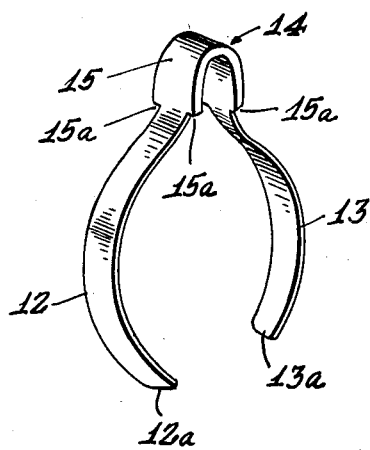
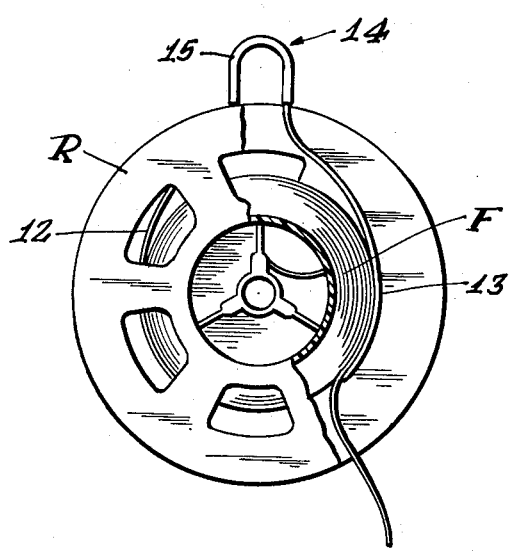
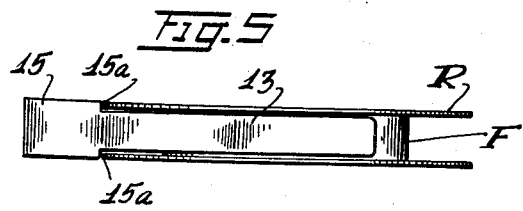
INVENTOR.
CHARLES W. MILLS
BY H. G. Manning
ATTORNEY.

United States Patent Office 2,928,538
Patented Mar. 15, 1960

2,928,538

TAPE OR FILM CLIP

Charles W. Mills, Plainville, Conn.

Application May 31, 1957, Serial No. 662,858

3 Claims. (Cl. 206—53)

My invention relates to holding devices and is directed particularly to a clip for holding a roll of wound material, such as magnetic tape and motion picture film, in place on a reel.

It is difficult to keep the loose end of a roll of magnetic tape and movie film in place so that they will not unravel and be damaged, and yet be accessible when needed, by ordinary devices such as Scotch tape, rubber bands and the like. As a result, the ends of such films or tapes in time become damaged to such an extent that they can no longer be used.

It is accordingly the principal object of my invention to provide a clip which is simple and effective in holding a roll of tape or film on its reel while handling, threading, shipping, storing, editing, splicing, etc.

Another object of my invention is to provide a clip of the above nature which is of unitary construction, which can readily be applied to and removed from a reel without damage to the tape or film and which will not interfere with packaging said reel in an ordinary square container.

A more particular object of my invention is to provide a film clip of the character described, which comprises a central U-shaped handle portion the ends of which extend into opposed resilient arcuate tong portions adapted to gently and resiliently press against opposite side portions of the reeled tape or film for holding the loose end in place at any desired position along its length.

Another object is to provide a film or tape clip of the above nature including means for keeping the handle portion thereof outside of the periphery of the reel where it can easily be reached for removal or adjustment, and which at the same time affords better holding of small amounts of tape or film on the reel, and holding on of the clip when the reel is empty.

Still another object is to provide a clip of the above nature which will automatically turn around a reel when the loose end of the roll of tape is pulled away from the reel to readily allow observation of additional portions of the tape or film without causing damage or unraveling.

A further object is to provide a device of the above nature which will be simple in construction, inexpensive to manufacture, easy to install and manipulate, compact, ornamental in appearance, and very efficient and durable in use.

Other objects, features and advantages of the invention will be apparent from the following description when read with reference to the accompanying drawings illustrating two forms in which the invention may conveniently be embodied in practice.

In the drawings,

Fig. 1 represents in perspective one form of the tape or film clip embodying the invention, Fig. 2 is a plan view with portions broken away, illustrating the clip shown in Fig. 1 on a film holding spool or reel and indicating in broken lines the shape of a box in which said reel is contained, Fig. 3 illustrates, in perspective, a second form of tape or film clip embodying the invention, Fig. 4 is a view similar to that of Fig. 2 showing the embodiment illustrated in Fig. 3 in use, and Fig. 5 is a side view of the film clip embodiment illustrated in Fig. 3 shown fitted to a film-carrying reel for holding the film in place.

Referring now in detail to the drawings, wherein like reference numerals denote corresponding parts throughout the several views, the numeral 10 designates the first embodiment generally, the same comprising a U-shaped handle portion 11, the arms of which are integrally formed with opposed arcuate tong-like grasping members 12, 13, having rounded ends as indicated by the reference numerals 12a, 13a.

The clip 10 can be made of any resilient, non-magnetic metal, but is preferably made from inexpensive durable, attractive and light-weight synthetic plastic such as Lucite or Plexiglas.

As is clearly evident in Figs. 1 and 2, the thickness of the handle portion 11 of the clip 10 may be somewhat greater than the thickness of the grasping members 12, 13 for providing greater stiffness at the handle. The clip 10 is also of uniform width, the width preferably being somewhat greater than the width of the film or tape with which the clip is to be used, yet narrow enough of course to fit easily within the reel R. By such construction, the reel sides or flanges will be buttressed to minimize the possibility of damage to the edges of the tape or film during storage, shipping or handling.

Fig. 2 illustrates the clip 10 in place on a reel R, such as a reel of 8 mm. home movie film, for example, and shows how the grasping members 12, 13 of the clip resiliently embrace the periphery of an amount of film F wound thereon for gently holding it in place. The handle portion 11 projects outwardly of the reel R, where it can readily be grasped for removal, yet does not project far enough to interfere with packaging in the usual square container C as represented by the broken lines in Fig. 2.

*Modified form*

The clip 14 illustrated in Figs. 3–5, differs from the clip 10 of Figs. 1 and 2 only in that the handle portion 15 thereof is of greater width than the grasping members 12, 13, to provide a pair of shoulders 15a which engage against the peripheral edges of the sides or flanges of the reel R when the clip 14 is applied thereto, as illustrated in Figs. 4 and 5. By this construction, the clip 14 is more effective in holding small amounts of tape or film on reels, and may also be kept attached to empty reels without looseness. It will be understood that the handle portion 15 of the clip 14 is prevented from entering the reel regardless of the amount of tape on the reel, so that it will always be available for grasping and removal, at all times.

*Operation*

In use, the tong-like film clip grasping members 12, 13, will be gently pushed by the handle portion 15 between the reel flanges and over the roll F of film or tape. With full spools, the grasping members 12, 13 may be spread manually to facilitate attachment of the clip 14. The clip can readily be removed simply by gently pulling the handle away from the reel.

One advantage of my improved clip is that it conveniently holds tape or film on its reel during storage, shipping and during threading or splicing operations.

Another advantage is that it minimizes damage to the edges of the tape or film during storage, shipping or handling by supporting the reel flanges.

Although only two forms in which the invention may be embodied in practice are described in this specification, it is to be understood that these forms are given by way of illustration only, and that the invention is not limited to the particular disclosures, but may be modified and embodied in various other equivalent forms without departing from its spirit. In short, the invention includes all the modifications and embodiments coming within the scope of the following claims.

Having thus fully described the invention, what is claimed as new and for which it is desired to obtain Letters Patent is:

1. A clip for holding a roll of film or magnetic tape upon a reel comprising a central spindle and a pair of end flanges of larger diameter than said spindle, said clip consisting of a narrow flexible band of thin resilient non-magnetic strip material, of greater width than said film or tape and including a pair of opposed inwardly concave elongated tong sections embracing the opposite sides of said film or tape, said tong sections having spaced apart outwardly extending arms extending beyond the periphery of said flanges and integrally joined by an outwardly convex loop which serves as a U-shaped handle to permit said clip to be manually moved freely about the circumference of said roll so that the end of said film or tape may be readily grasped for observation or removal.

2. The invention as defined in claim 1, in which said handle is of greater width and thickness than said tong sections to provide stiff shoulders at the junctions with said handle in order to maintain it outside said flanges in accessible position at all times.

3. The invention as defined in claim 1, in which said handle is of greater width than said tong sections to provide shoulders at the junction of said toggle portions in order to maintain said handle outside said flanges in accessible position at all times.

References Cited in the file of this patent

UNITED STATES PATENTS

| | | |
|---|---|---|
| 595,059 | Graham | Dec. 7, 1897 |
| 714,963 | Steinkamp | Dec. 2, 1902 |
| 1,229,312 | Newhouse | June 12, 1917 |
| 1,274,344 | Staub | July 30, 1918 |
| 1,338,612 | Buschardt | Apr. 27, 1920 |
| 1,468,636 | Hoeft | Sept. 25, 1923 |
| 1,478,896 | Ferency | Dec. 25, 1923 |
| 1,682,115 | Cohn | Aug. 28, 1928 |
| 2,310,156 | Van Der Clute | Feb. 2, 1943 |

FOREIGN PATENTS

| | | |
|---|---|---|
| 18,867 | Great Britain | of 1910 |
| 866,602 | Germany | Feb. 12, 1953 |